(12) United States Patent
Hirabayashi et al.

(10) Patent No.: US 7,188,187 B2
(45) Date of Patent: Mar. 6, 2007

(54) FILE TRANSFER METHOD AND SYSTEM

(75) Inventors: Motoaki Hirabayashi, Yokohama (JP); Masao Menjo, Yokohama (JP); Naoki Shimada, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 712 days.

(21) Appl. No.: 10/230,277

(22) Filed: Aug. 29, 2002

(65) Prior Publication Data

US 2003/0200275 A1 Oct. 23, 2003

(30) Foreign Application Priority Data

Apr. 23, 2002 (JP) ............... 2002-120530

(51) Int. Cl.
*G06F 15/16* (2006.01)

(52) U.S. Cl. .................. 709/232; 711/111; 709/249

(58) Field of Classification Search ............... None
See application file for complete search history.

(56) References Cited

U.S. PATENT DOCUMENTS

| | | | |
|---|---|---|---|
| 6,421,723 B1 * | 7/2002 | Tawil | 709/224 |
| 6,606,690 B2 * | 8/2003 | Padovano | 711/148 |
| 6,715,031 B2 * | 3/2004 | Camble et al. | 711/111 |
| 6,721,851 B2 * | 4/2004 | Ohr | 711/133 |
| 6,792,557 B1 * | 9/2004 | Takamoto et al. | 714/7 |
| 6,826,580 B2 * | 11/2004 | Harris et al. | 707/202 |
| 6,839,824 B2 * | 1/2005 | Camble et al. | 711/173 |
| 6,845,387 B1 * | 1/2005 | Prestas et al. | 709/203 |
| 6,848,007 B1 * | 1/2005 | Reynolds et al. | 709/245 |
| 6,898,670 B2 * | 5/2005 | Nahum | 711/114 |
| 6,920,538 B1 * | 7/2005 | Ohr | 711/163 |
| 6,977,927 B1 * | 12/2005 | Bates et al. | 370/381 |
| 2002/0083120 A1 * | 6/2002 | Soltis | 709/200 |
| 2002/0156984 A1 * | 10/2002 | Padovano | 711/148 |

FOREIGN PATENT DOCUMENTS

| | | |
|---|---|---|
| JP | 2001051890 | 2/2001 |
| JP | 2001306403 | 11/2001 |

* cited by examiner

*Primary Examiner*—John B. Walsh
(74) *Attorney, Agent, or Firm*—Mattingly, Stanger, Malur & Brundidge, P.C.

(57) ABSTRACT

To provide a file transfer method and system capable of making backups in a unified manner at backup sites and MSP (Management Service Provider) operating under an around-the-clock system with high reliability equipment. When data to be transferred such as backup is transferred between SAN (Storage Area Network) storing units to back up the data stored in the SAN, a data transfer instruction is sent to the transfer source and transfer destination of the data transfer via a network which is different from the SAN.

5 Claims, 15 Drawing Sheets

FIG. 6A

REPOSITORY CONFIGURATION

CONFIGURATION INFORMATION — 601

NETWORK CONFIGURATION INFORMATION — 602

STORAGE CONFIGURATION INFORMATION — 603

SCENARIO DEFINITION INFORMATION (SCRIPT) — 604

SCHEDULE — 605

POLICY DEFINITION INFORMATION — 606

HISTORY INFORMATION — 607

FIG. 6B

EXAMPLE OF STORAGE CONFIGURATION INFORMATION

- PHYSICAL ADDRESS AND CONNECTION INFORMATION
- INFORMATION INDICATING DB LOCATION
- INFORMATION INDICATING WHERE BACKUP OF MASTER DB IS LOCATED
- INFORMATION INDICATING EARTHQUAKE RESISTANCE, 24-HOUR MONITORING
- PRICE PER UNIT VOLUME

EXAMPLE OF POLICY DEFINITION INFORMATION

- PURPOSE OF USE OF MASTER DB (BACKUP OR DATA WAREHOUSE)
- DISK BACKUP OR TAPE BACKUP
- CONFIDENTIALITY LEVEL
- PAST THROUGHPUT, BACKUP RESTORING TIME

AP MAP

| TABLE NAME | FILE NAME |
|---|---|
| TB1 | bbb.ccc |
| | |
| | |

FIG. 13B

CORE MAP

| FS | LVM | DEVICE | RAID |
|---|---|---|---|
| /aaa1 | lvol1 | c0t0d0 | SERIAL#.LDEV# |
| | | | |
| | | | |

FIG. 13C

CG MAP

| NAME | COPY SOURCE | COPY DESTINATION | TAPE | ROUTE INFORMATION |
|---|---|---|---|---|
| VG01 | SERIAL#.LDEV# | SERIAL#.LDEV# | MEDIA ID | |
| | | | | |
| | | | | |

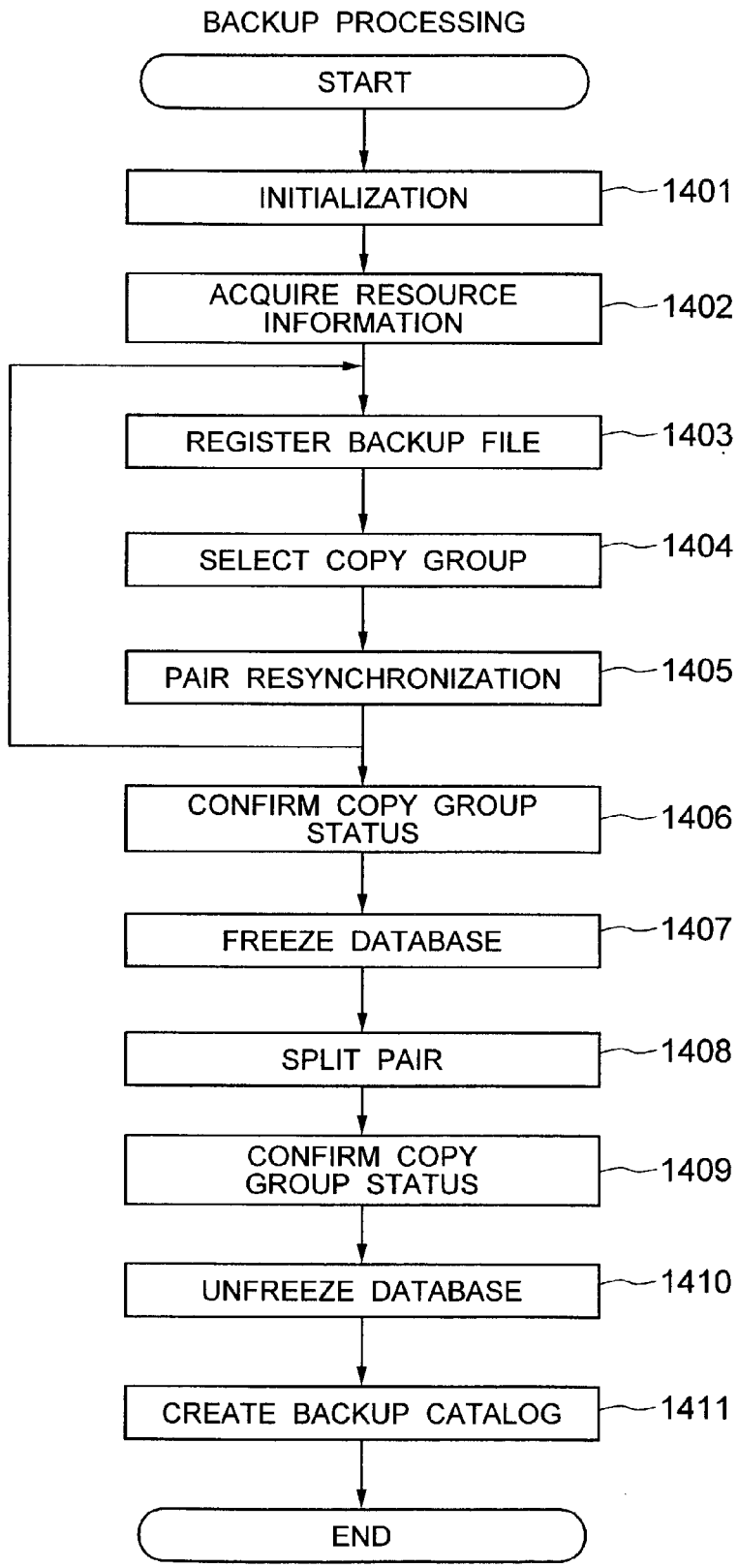

FILE TRANSFER METHOD AND SYSTEM

BACKGROUND OF THE INVENTION

The present invention relates to a file transfer method and system for transferring files to a remote place and making backup copies, etc. using a SAN (Storage Area Network).

In contrast to a system for connecting computers via a network, SAN (Storage Area Network), a system which connects storages via a network such as the one described in JP-A-2001-306403 is conventionally known. The SAN normally connects storages via a fibre channel switch. It also allows connections with remote places through a channel extender. The SAN features high-speed and stable transfers between storages.

Shadow Image is a technology of outputting the same content to two disks in the same housing using a dual disk writing technology on the SAN. The Shadow Image separates the disk on the shadow side at proper timing and uses the disk for a backup to a magnetic tape, etc. Remote Copy is a technology of directly transferring data between disks at remote locations using the SAN.

NAS (Network Attached Storage) is a storage system that directly connects to a network between computers. The NAS is provided with a file server function and once connected to a network, the NAS is immediately made available. An example of this conventional technology is described in JP-A-2001-051890.

For managing a network between computers, there is a management system provided with a function of displaying a network map. The network map shows what kind of servers are connected to a network. On the other hand, the SAN is also provided with a storage map display function. This shows what kind of storages are connected to the SAN. The network map and storage map exist as completely different technologies.

SUMMARY OF THE INVENTION

However, to make a backup copy at a remote place using the SAN, the transmitting side needs to start a remote copy and the receiving side needs to start a process of making a backup copy to a magnetic tape after the transfer is completed, etc., which requires two operators. Since SCSI (Small Computer System Interface) is used as a standard protocol between a computer and the SAN, which is mainly intended for simple control such as reading and writing, it is difficult to automate this process including sending instructions to devices on the receiving side using the SAN. Attempting this automation requires an independent protocol to be carried on the SCSI, which constitutes a problem with mutual connections.

Using the NAS results in a connection of servers and storages to the same network, which simplifies management. However, since the storages are accessed through the server, there is a problem that data transfers for backups makes the processing heavier. Another problem is that using the network for multiple purposes makes the system unstable.

Attempting to make high-speed data transfers by using the SAN cannot help but confine the transfer distance within a narrow range. This is because while a data transfer between disks in a short distance can be made at a high speed using a fibre channel, connections with remote locations are made using a channel extender and in this case, there may be a low-speed network such as WAN between the channel extenders. However, only providing backups in short distances cannot cover disaster in a wide area.

It is an object of the present invention to provide, for the purpose of diversification of risk, backup sites capable of allowing backups of files at remote places and operating around the clock with high reliability equipment and provide a file transfer method and system capable of making backup copies in a unified manner using MSP (Management Service Provider). It is another object of the present invention to make it easier to create a replicated database, which can be used for data warehouse, mining and decision-making support systems, etc.

In order to attain the above objects, when data to be transferred for backup, etc. is transferred between SAN (Storage Area Network) storing means to make backup copies of data stored in the SAN, the present invention is characterized by sending instructions for data transfers to the source and destination of the data transfer via a network which is different from the SAN. When the instructions for data transfers via the network are received, the data to be backed up is transferred between the SAN storing means using SAN functions.

Furthermore, the present invention provides a scenario which allows a series of a plurality of commands to be executed sequentially to perform file transfer processing such as backups so that backups can be performed easily by executing the scenario. Furthermore, the present invention has made it possible to specify a policy. The policy is a conceptual expression of a course of action about backups. Once the policy is specified, the system selects and executes a scenario, which realizes a course of action of the policy.

Furthermore, when there are logical data layers in a system that uses the storing means of the SAN, link information which stores correspondences between the different layers of identifiers that identify data is stored. Then, when data is transferred from the transfer source to the transfer destination, the link information is referenced. These logical layers include a database layer, file layer, file system layer, logical volume layer, device file layer, disk serial number and device number layers, and it is link information that describes correspondences between names for identifying data in the respective layers. Furthermore, the link information also includes copy group map information that defines a group of disks to which data is copied. When, for example, a table to be transferred is specified in a database layer, by tracing the database all the way down based on the link information, it is possible to find the serial number and device number of the disk in which the table is stored and know the copy destination of the copy group whose copy source is the disk from the copy group map information and thereby make a backup copy easily.

Other objects, features and advantages of the invention will become apparent from the following description of the embodiments of the invention taken in conjunction with the accompanying drawings.

BRIEF DESCRIPTION OF THE DRAWINGS

FIGS. 6A, 6B and 6C illustrate configuration examples of a repository;

FIGS. 13A, 13B and 13C illustrate configurations of map information;

FIG. 14 is a flowchart showing a procedure for backup processing; and

DESCRIPTION OF THE EMBODIMENTS

With reference now to the attached drawings, embodiments of the present invention will be explained below.

Figure 1:
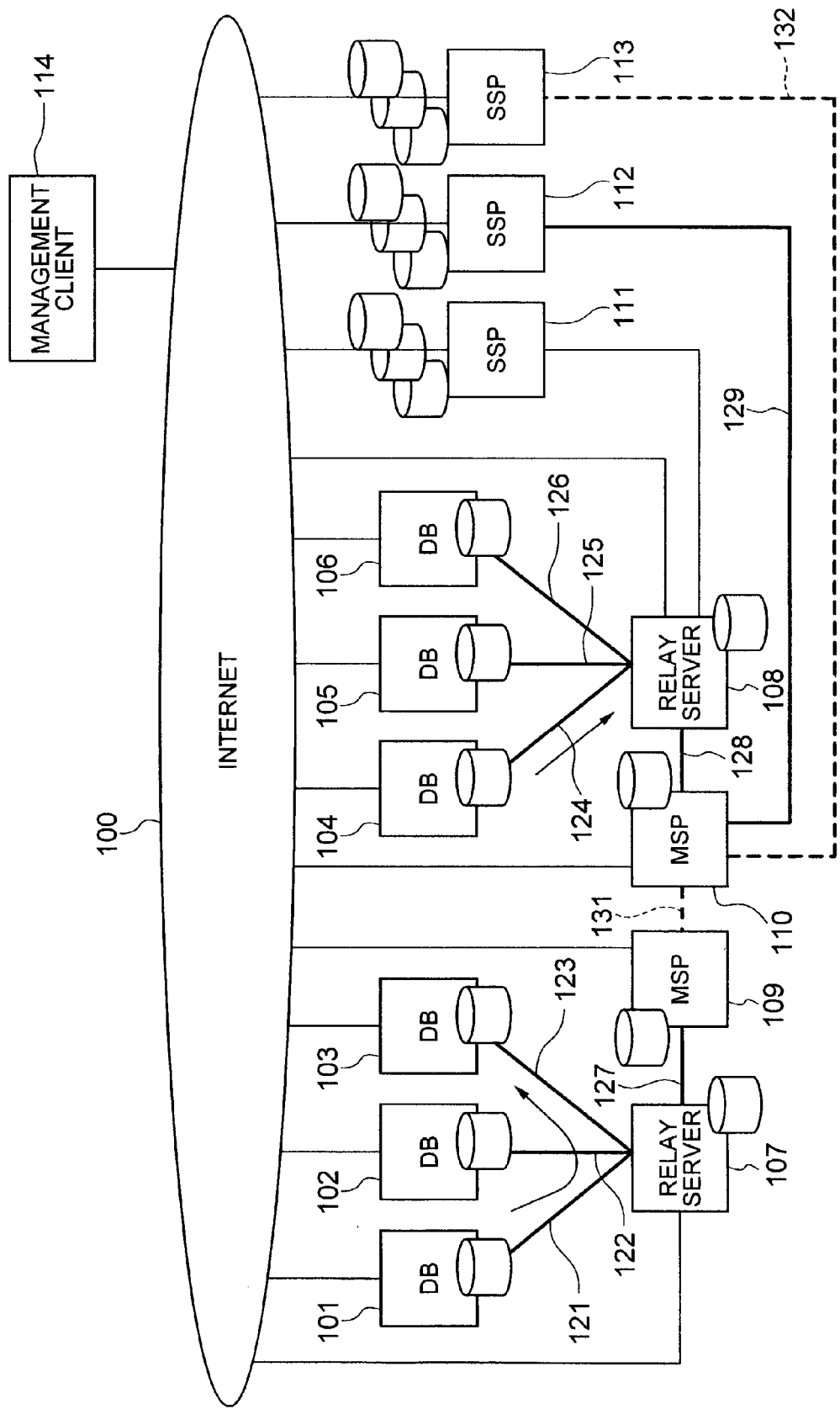
FIG. 1 illustrates a configuration example of a system to which a file backup method of the present invention is applied.

FIG. 1 illustrates a configuration example of a system to which a file backup method of the present invention is applied. This system is provided with the Internet 100, database (DB) servers 101 to 106, relay servers 107 and 108, MSP (Management Service Provider) servers 109 and 110, SSP (Storage Service Provider) servers 111 to 113 and a management client 114. By the way, the MSP servers will be simply referred to as "MSP" and the SSP servers will be simply referred to as "SSP".

The DB servers 101 to 106 are each provided with an arbitrary number of disk apparatuses and each disk apparatus consists of a SAN provided with a fibre channel switch (FC-SW). For example, the disk apparatuses of the DB servers 101 to 106 are storage devices to store various kinds of data of bank accounts and applicable to a case where data in the DB's is updated according to instructions for receipt of money or payment sent from a computer of a bank accounting system. Since the present invention relates to a file transfer function such as backup, the figure illustrates only the parts related to file transfers.

The relay server 107 and DB servers 101 to 103 are connected via fibre channels 121 to 123. The relay server 108 and DB servers 104 to 106 are connected via fibre channels 124 to 126. The relay server 107 and MSP 109 are connected via a fibre channel 127. The relay server 108 and MSP 110 are connected via a fibre channel 128. The MSP 110 and SSP 112 are connected via a fibre channel 129. The MSP 109 and MSP 110 are connected via the high-speed Internet 131. The MSP 110 and SSP 113 are connected via the high-speed Internet 132. The fibre channels 121 to 129 are shown with thick solid lines. The high-speed Internets 131 and 132 are shown with thick dotted line. Thin solid line indicates that components are connected via the normal Internet.

The SSPs 111 to 113 are provider servers that perform storage services (services of supplying disk apparatuses) and the MSPs 109 and 110 are provider servers dedicated to backups. The relay servers 107 and 108 are servers serving as data relay sites when the data of the DB servers is backed up by the MSP and SSP. The fibre channels 121 to 129 are interfaces that connect devices within a range of transmission distance up to 10 km. The high-speed Internets 131 and 132 connect devices at long distances. Normally, it is often the case that a high-speed Internet backbone is installed between MSPs or between MSP and SSP and this corresponds to the high-speed Internets 131 and 132.

By the way, the configuration in FIG. 1 is only an example and the present invention is also applicable to other configurations.

Figure 9:
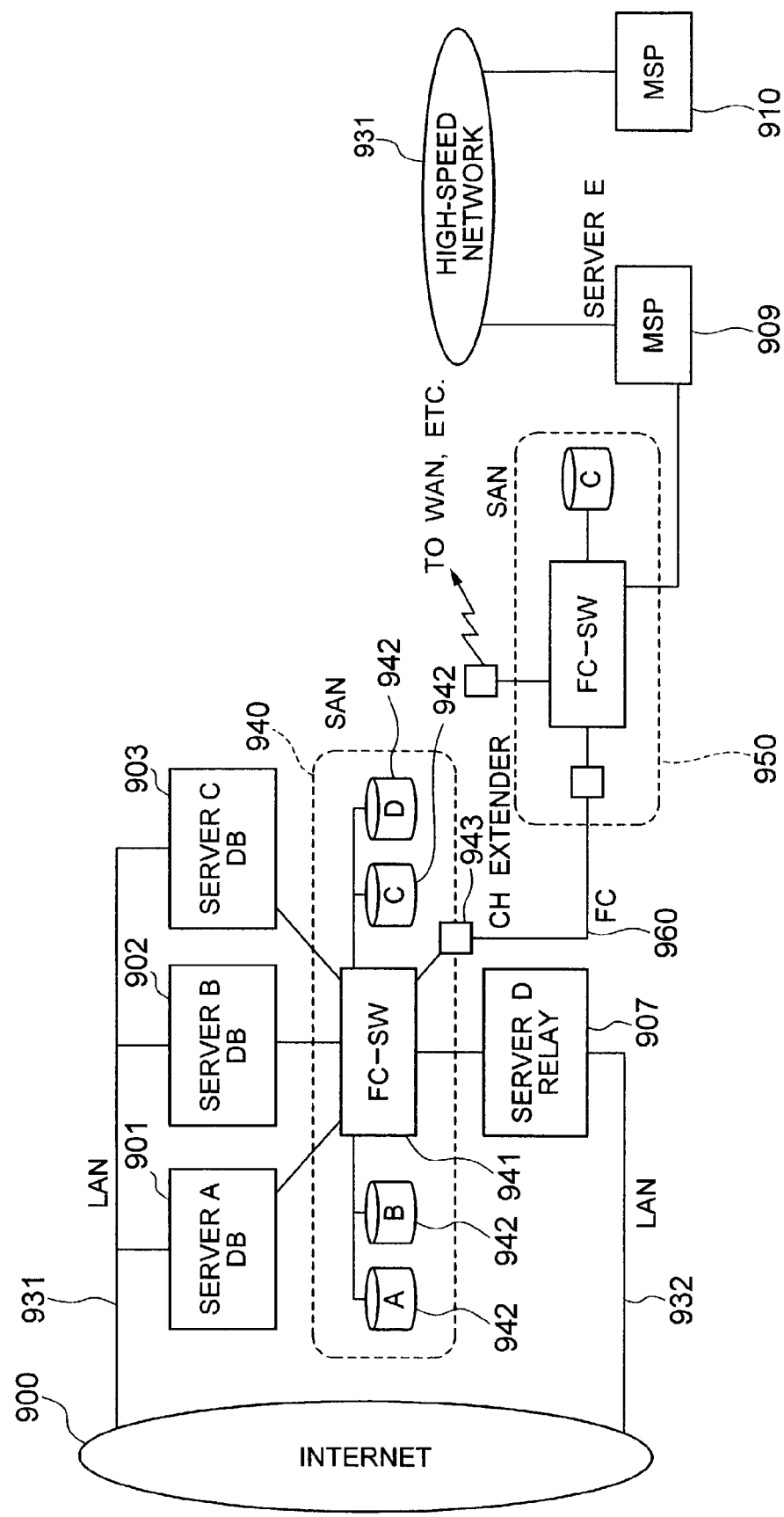
FIG. 9 is a block diagram showing a physical configuration of the system in FIG. 1.

Moreover, FIG. 1 illustrates the storage configuration and network configuration in a simplified manner, but the actual storage configuration and network configuration have a configuration as shown in FIG. 9 (configuration of part of FIG. 1). The correspondences between various sections in FIG. 9 and those of FIG. 1 are as follows. First, the Internet 900 corresponds to the Internet 100; the DB servers 901 to 903 to the DB servers 101 to 103; the relay server 907 to the relay server 107; the MSP servers 909 and 910 to the MSP servers 109 and 110; the high-speed network 931 to the high-speed network 131, respectively. Moreover, the DB servers 101 to 103 and relay server 107 are connected to the Internet 100 in FIG. 1, but they are normally connected to the Internet 900 via LANs 931 and 932 as shown in FIG. 9. FIG. 1 shows that the DB servers 101 to 103 and relay server 107 are accompanied by their respective disk apparatuses and connected via the fibre channels 121 to 123, but as shown in FIG. 9 the DB servers 901 to 903 and relay server 907 are actually connected to a fibre channel switch (FC-SW) 941 of a SAN 940 and an arbitrary number of disk apparatuses 942 are connected to the fibre channel switch 941. The fibre channel 127 that connects the relay server 107 and MSP 109 in FIG. 1 is actually connected to the fibre channel switch of the SAN 950 on the MSP 909 side by the fibre channel 960 through a channel extender 943, etc. as shown in FIG. 9.

The system will be explained with reference to FIG. 1 below. First, an outline of the backup function of the system in FIG. 1 will be explained. In the system in FIG. 1, a backup will be made in the following mode, for example.

<1> The data of the first disk of the DB server 101 is backed up to the second disk in the same housing.

<2> The data of the DB server 101 is backed up to the DB server 103.

<3> The data of the DB server 104 is backed up to the SSP 111 to 113 through the relay server 108 and MSP 110. There is a plurality routes from the relay server 108 to SSP. For example, when the data is backed up intermediately by the relay server 108 and the data is sent to the SSP 111 over the Internet for backup, or when the data is sent through the relay server 108 and MSP 110 on the fibre channel 129 to the SSP 112 for backup or when the data is sent through the relay server 108 and MSP 110 and sent to the SSP 113 through the high-speed Internet 132 for backup, etc.

The above Item <3> further includes various modified modes. For example, it is also possible to make a backup from the relay server 108 to the SSP directly through the fibre channel or through the high-speed Internet. It is also possible to combine and connect relay servers and MSPs arbitrarily and make a backup through the relay servers and MSPs.

The backup according to this system has the following features. First, when a backup is made, a replication volume creation function of the SAN is used. For example, ShadowImage (technology of dual-writing into a plurality of disks in the same housing) or RemoteCopy (technology of transferring data between disks in different housings).

Various devices in the system are mutually connected through the Internet (TCP/IP) 100. Instructions for backups are transmitted through the Internet. Especially when data is transferred between SANs for backup, it is possible to use the replication function, etc. of the SAN for data transfer and transmit that instruction through the Internet. Therefore, data can be transferred at high speed and the protocol (SCSI) between the computer and SAN need not be expanded. The Internet has an advantage that any locations can be specified as URLs and are easily replaceable. It is also resistant to disaster and can be managed from arbitrary clients. By the way, the network 100 need not necessarily be the Internet.

Even if locations are specified by URLs, the locations are not necessarily connected directly by the SAN. In such a case, for intermediate points not connected by the fibre channel, data is transferred through the Internet. Since there is a high probability that the MSP includes a high-speed Internet backbone, using this Internet backbone will make it possible to perform high-speed backup processing even if they are not connected by the SAN.

For a high-speed backup, the ShadowImage function of the SAN is used to make a copy at high speed and then send the copy to a remote place. This minimizes the down time. Restoration can also be sped up by keeping the nearest backup on standby on the ShadowImage side.

This system allows backups to be made at a plurality of locations. As shown in FIG. 1, if a configuration where data is backed up by the SSPs through relay servers and MSPs is adopted, backups are made even at locations through which transferred data passes, and therefore backups are realized at a plurality of locations. This makes it possible to realize more reliable backups. When data is restored, it is possible to transfer restoration data from the closest location on the network. If information exists at a plurality of locations, it is possible to know using the Internet where and what kind of backups exist and thereby restore the data from/to anywhere. At relay locations, the latest backups are made and backups made several generations ago are automatically transferred to remote locations. This requires only a small capacity of storage at relay locations and makes it possible to store backups of many locations.

At the time of instructing backups, this system can perform automatic backups according to a scenario. The scenario refers to a script for automatically executing a series of steps necessary to make a backup. For example, it is possible to select locations with fast transfers based on the past transfer rates and make backups at high speed.

Once a scenario is created, only executing the scenario allows high-speed automatic backups. Furthermore, as a job scenario, data may be backed up to a magnetic tape or it is also possible to create a queue for data to be backed up to a tape for automatic control. Providing a queue releases the disk on the transmitting side without the need to wait until a write to a low-speed magnetic tape is completed, and thereby makes it possible to effectively use the disk on the transmitting side and resume the operation earlier. By the way, when data is put into the queue, the data on the receiving side is temporarily saved in the disk and released after the write to the tape is completed. Furthermore, if there are not sufficient backup disks, it is also possible to automatically transfer data to other backup locations according to a scenario. At this time, it is also possible to select geographically remote locations.

In addition to automatic backup operation according to the scenario, it is also possible to perform conceptual automatic control based on specification of a policy. The policy indicates a course of action about a backup. For example, if the level of safety is specified to be high as a policy, a backup is made automatically at a distant place. The user can use a policy to conceptually instruct through what course of action a backup is made.

This system displays an overall map to manage a computer list and storage list. Transfer destinations and sources are specified using server names and LDEV (device identifiers). LDEV seen from each server is managed by a repository. Showing the overall map facilitates the specification. Locations may not always be connected between arbitrarily specified servers through the SAN, but if data can be transferred to the locations through the SAN, a high-speed network can be used between the locations. This should also be managed.

A backup is instructed from the management client 114. A browser is operating at the management client 114. There are management servers to be accessed from the management client at arbitrary locations in the system. Though not shown in FIG. 1, for example, the relay servers 107 and 108 can be used as those management servers.

Figure 2:
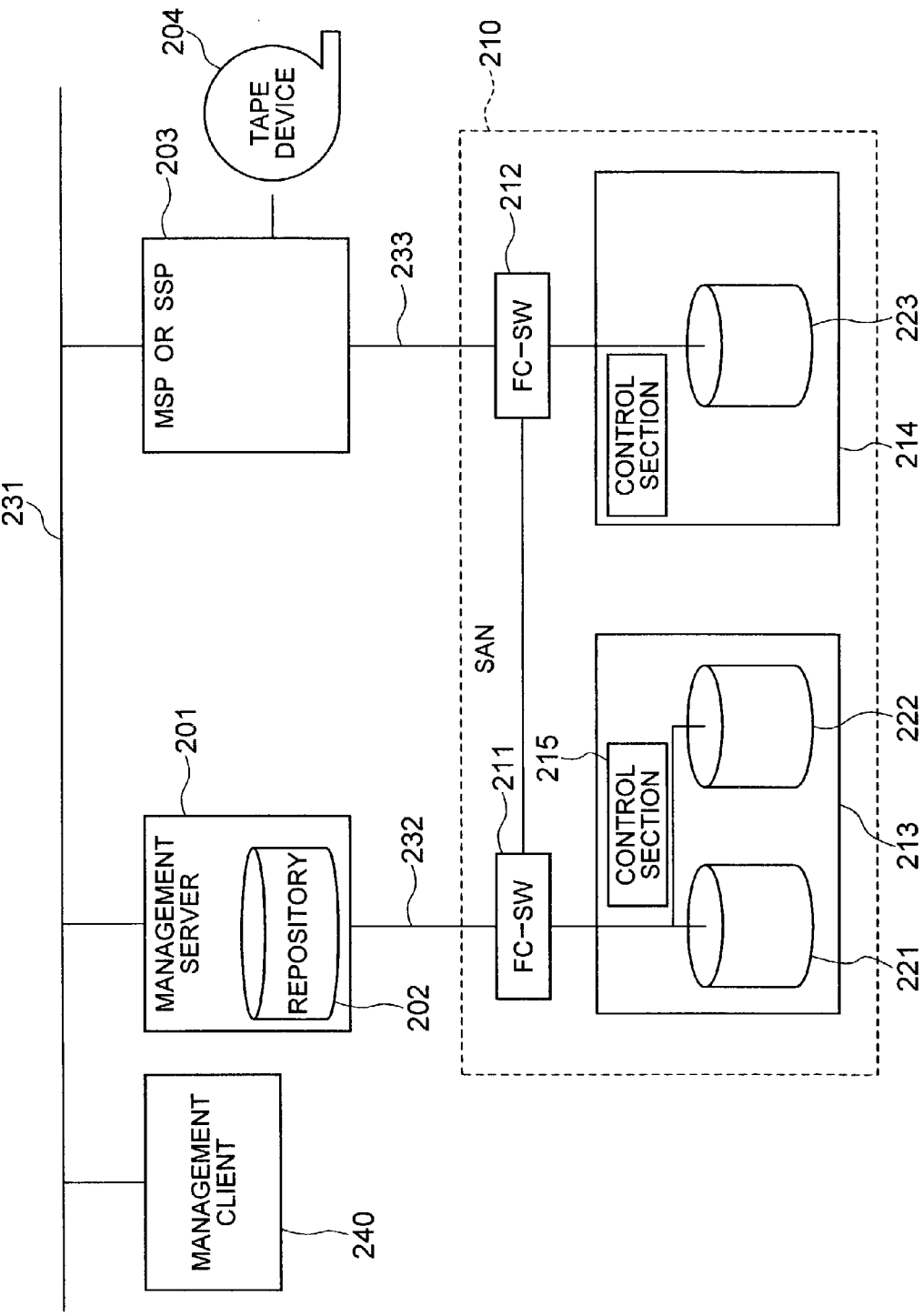
FIG. 2 illustrates a typical example of making a backup.

FIG. 2 illustrates a typical example of making a backup. A management client 240 is a client that issues an instruction for a backup. A management server 201 is a server that performs backup processing according to the instruction from the management client 240. The management server 201 is provided with a repository 202. The repository 202 stores network configuration information, storage configuration information, scenario definition information, schedule information, policy definition information and history information, etc. A SAN 210 is a storage system that makes up a DB to which a backup copy is made. The SAN 210 is provided with fibre channel switches 211 and 212 and disk groups 213 and 214. The disk group 213 is provided with a control section 215 and a plurality of disk apparatuses 221 and 222. Suppose the disk group 214 is provided with a disk apparatus 223 in the like manner. An MSP or SSP 203 is a backup system having a tape apparatus 204.

In FIG. 2, suppose the SAN 210 is operating in a mode in which the disk apparatuses 221 to 223 are operated in synchronization with one another. That is, the same content is written into the disk apparatuses 221 and 222 by ShadowImage. Furthermore, these apparatuses 221 and 222 are also synchronized with the disk apparatus 223 into which the same content is written.

A backup is carried out by an instruction from the management client 240. The management client 240 issues only an instruction for executing a predetermined scenario. The management server 201 reads the specified scenario from the repository 202 and executes it. The scenario is, for example, to issue a command to the SAN 210 using the following procedure:

<1> Enter into a backup mode of TBS (table space) of DB: This instructs that data written into the DB from now on should be written into a separately provided log area.
<2> Freeze file system: This instructs that I/O to/from the disk apparatuses should be stopped at the file system level of the OS.
<3> Execute split command of disk apparatus: This instructs that the disk apparatus 223 should be separated.
<4> Wait for completion of split command
<5> Unfreeze file system
<6> Cancel DB backup mode: This allows the content written in the buffer to be reflected in the disk apparatuses 221 and 222 and also allows subsequently written contents to be reflected. The disk apparatus 223 remains separated.

<7> Make a backup copy of content of disk apparatus 223 to tape apparatus 204

<8> Issue resync command: This allows the contents of the disk apparatuses 221 and 222 to be reflected in the disk apparatus 223 and these disk apparatuses 221 to 223 start to operate resynchronized.

When the disk apparatus 223 is operating asynchronously, before the disk apparatus 223 is separated by the split command, it is possible to make a remote copy from the disk apparatuses 221 and 222 to the disk apparatus 223 and equalize their contents, and then separate the disk apparatus 223 to make a backup copy.

Instructing the execution of such a scenario with the following procedure makes it easier to make a backup copy to the tape of the DB.

This is a typical example of a backup. This typical example is applicable to backups of the various sections of the system in FIG. 1. For example, assuming that the storage used by the DB server 101 in FIG. 1 is the SAN 210 in FIG. 2 and the MSP or SSP 203 in FIG. 2 is at the position of the relay server 107 in FIG. 1, a backup copy of the file of the DB server 101 can be made. In this case, the disk apparatuses 221 and 222 and disk apparatus 223 in FIG. 2 can also belong to different SANs.

Furthermore, in FIG. 2, it is also possible to allow the route from the SAN 210 to MSP or SSP 203 to match the route from the DB server 104 to relay server 108, MSP 110 and SSP 112 in FIG. 1. This allows the content of the DB server 104 to be backed up to the tape of the SSP 112 through various intermediate locations. In this case, it is necessary to add the processing of passing through the various locations to the above-described scenario.

Figure 3:
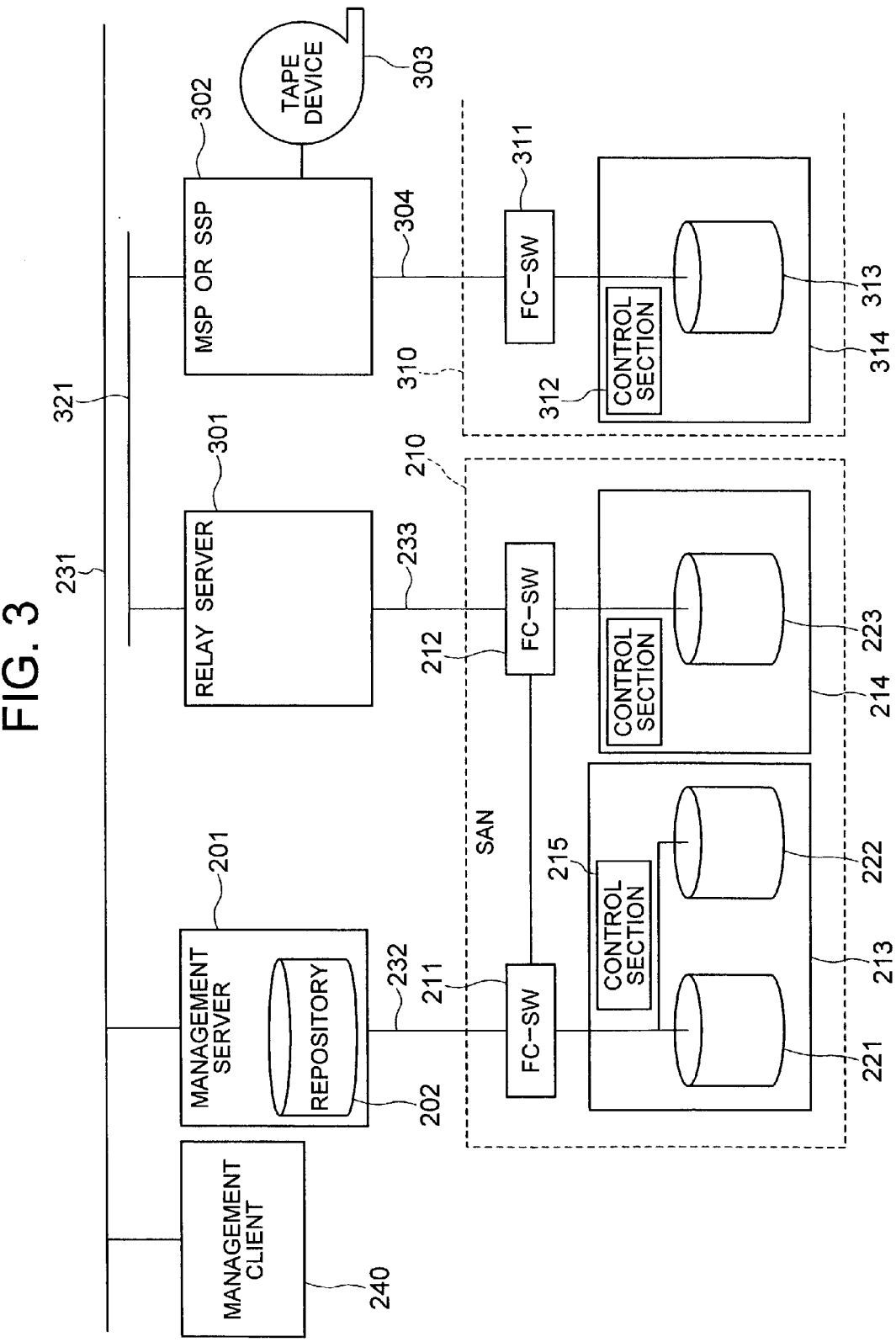
FIG. 3 illustrates another typical example of making a backup.

FIG. 3 illustrates a typical example of backup different from FIG. 2. The same components as those in FIG. 2 are assigned the same reference numerals and explanations thereof will be omitted. What differs from FIG. 2 is that a relay server 301 is connected to the fibre channel switch 212 of the SAN 210 and the relay server 301 and MSP or SSP 302 are connected via a high-speed Internet 321. A tape apparatus 303 for backups is connected to the MSP or SSP 302. Furthermore, a SAN 310 is connected to the MSP or SSP 302. The SAN 310 is provided with a fibre channel switch 311 and disk group 314. The disk group 314 is provided with a control section 312 and disk apparatus 313.

FIG. 3 is equivalent to FIG. 1 with the MSP 110 removed and the relay server 108 connected to the SSP 113 through the high-speed Internet 132. This allows data to be transferred from the disk apparatus 223 to the disk apparatus 313 through the relay server 301, high-speed Internet 321 and MSP or SSP 302.

In both cases of FIG. 2 and FIG. 3, instructions to various devices according to a scenario are sent through the Internet. The management server 201 can know the network configuration and storage configuration by means of the repository 202 and issue backup instructions according to those configurations.

A DB backup, operation interlock, schedule execution and disaster recovery, etc. are provided as basic scenarios. As explained in FIG. 2 above, a DB backup is a scenario consisting of splitting a ShadowImage disk at timing at a DB check point, transferring data from there to the disk where the tape apparatus is located by means of a remote copy and making a backup after the copying is completed. The operation interlock scenario consists of making a DB backup at timing at which an on-line operation ends. The schedule execution scenario consists of making a backup on a specified date and at a specified time. For example, it is possible to back up data at specified intervals or under specific conditions (every Saturday or at the end of every month, etc.). It is also possible to write a scenario of making a full backup at the end of every week and making a differential backup at 18:00 everyday. The disaster recovery scenario consists of restoring data in a subsystem at a remote place when a main system is down and starting the subsystem.

Furthermore, there are extended scenarios as follows:

<1> Scenario of changing places of backup from one generation to another: For example, a first generation is backed up in Tokyo, while a second generation is backed up in Osaka.

<2> Scenario of recording backup information distributed to a plurality of places.

<3> Capacity management scenario: For example, price per usage of an SSP with small remaining capacity is raised so that it is infrequently selected. Furthermore, when the remaining capacity falls below a certain level, a portion of the stored backup that satisfies transferable conditions is transferred to other SSPs. When a specified amount of usage is exceeded, another volume is added on to expand the capacity. When the amount of usage continues to be below a specified amount of usage for a certain period, the capacity is reduced.

This system makes it possible to specify a conceptual course of action of backup through specification of a policy. The following policies can be specified:

<1> Safety level: If, for example, safety is specified to a high level, data is backed up at a place at a certain distance or farther from the DB. Furthermore, data is backed up taking into account local disaster such as fire or temporary disaster such as power failure or wide area disaster such as earthquake.

<2> Performance level: Past throughput is recorded and data is backed up in a place where the data can be restored within a specified time. Furthermore, a backup nearest to a relay server is kept on standby.

<3> Usage: When a backup is specified as usage, data is backed up with safety first (distance, earthquake resistance, 24-hour monitoring) and when data warehouse is specified as usage, data is backed up with performance first and at low cost.

<4> Flexibility level: It is decided which of restoration time or flexibility should be given higher priority. If data is saved in a disk, recovery is quick, but it might not work in the event of a fault or power failure. If data is saved in a tape, it takes time to read and recover the data from the tape, but the tape can be carried so that the data is recovered from other systems. Furthermore, since the fibre channel is a dedicated channel, it might be cut in the event of disaster, but sending control information over the Internet makes it possible to save the content of the backup server to a tape and carry it or restore it by bypassing the Internet.

<5> Confidentiality level: This decides whether the system should be included in a backup server management system over the Internet or not, or decides whether the relay servers should use a high-speed Internet or not, or decides the use/non-use of encryption or the encryption level.

Figure 4:
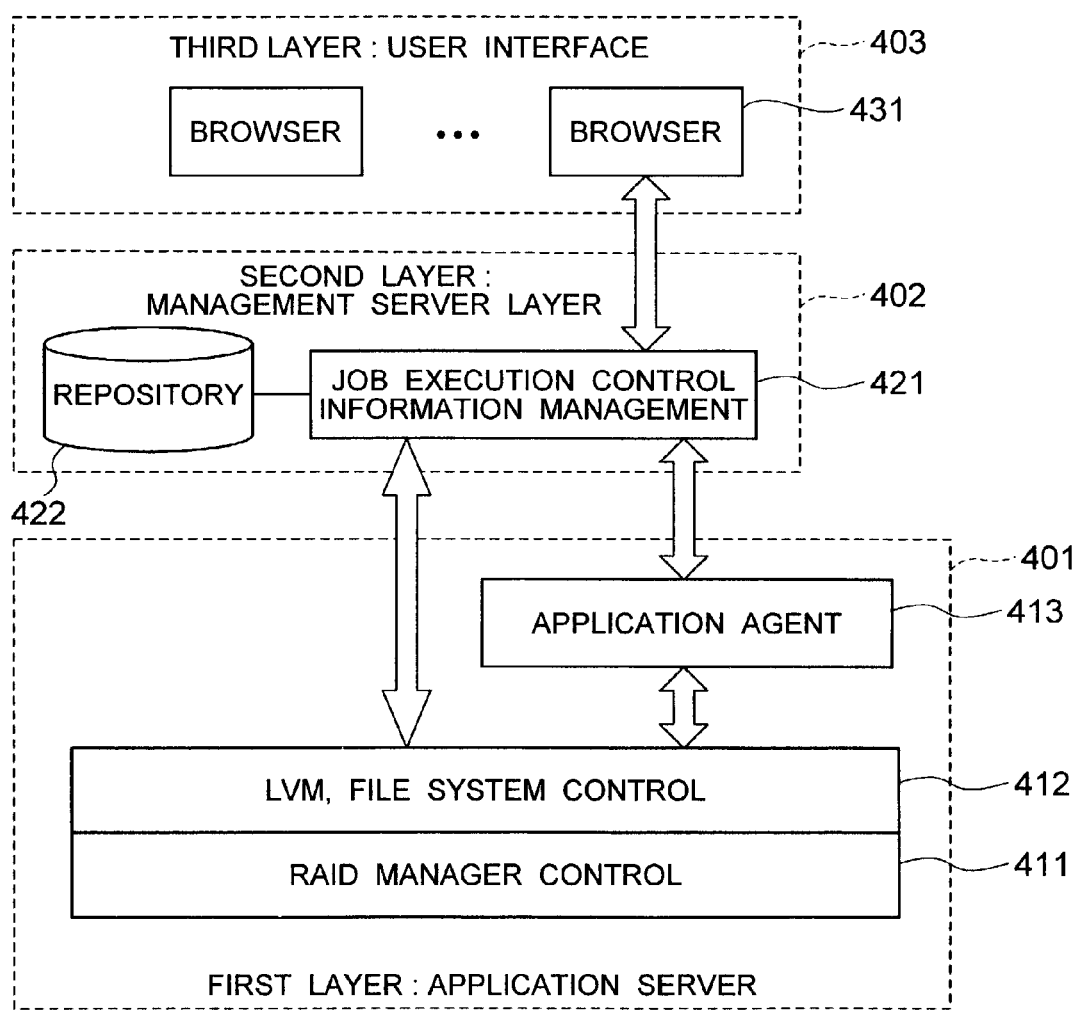
FIG. 4 illustrates a software configuration to realize a backup function.

FIG. 4 shows a software configuration to realize the above-described backup function. It roughly consists of three layers. The first layer is an application server layer 401, the second layer is a management server layer 402 and the third layer is a user interface layer 403. The application server layer 401 includes a RAID manager control 411, a file system control 412 and an application agent 413, etc. The RAID manager control 411 and file system control 412 are software to mainly perform control over the SAN. The application agent 413 is an agent placed inside each apparatus and is the part to realize the function of collecting DB configuration information, etc. and the function of executing a backup. The management server layer 402 includes job execution control and information management 421 and repository 422, etc. The management server layer 402 is software that operates on the management server explained in FIG. 2 and FIG. 3, manages the information acquired from the first layer on the repository 422, starts and monitors a job operating in the agent and responds to a process request from the user. The user interface layer 403 is provided with a browser 431. The user interface layer 403 operates on the management client and provides a user interface.

Figure 5A:
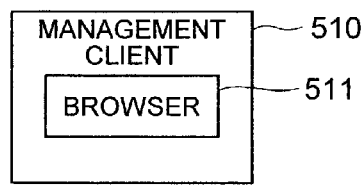
FIGS. 5A and 5B illustrate specific software configurations at a management client and management server.
Figure 5B:
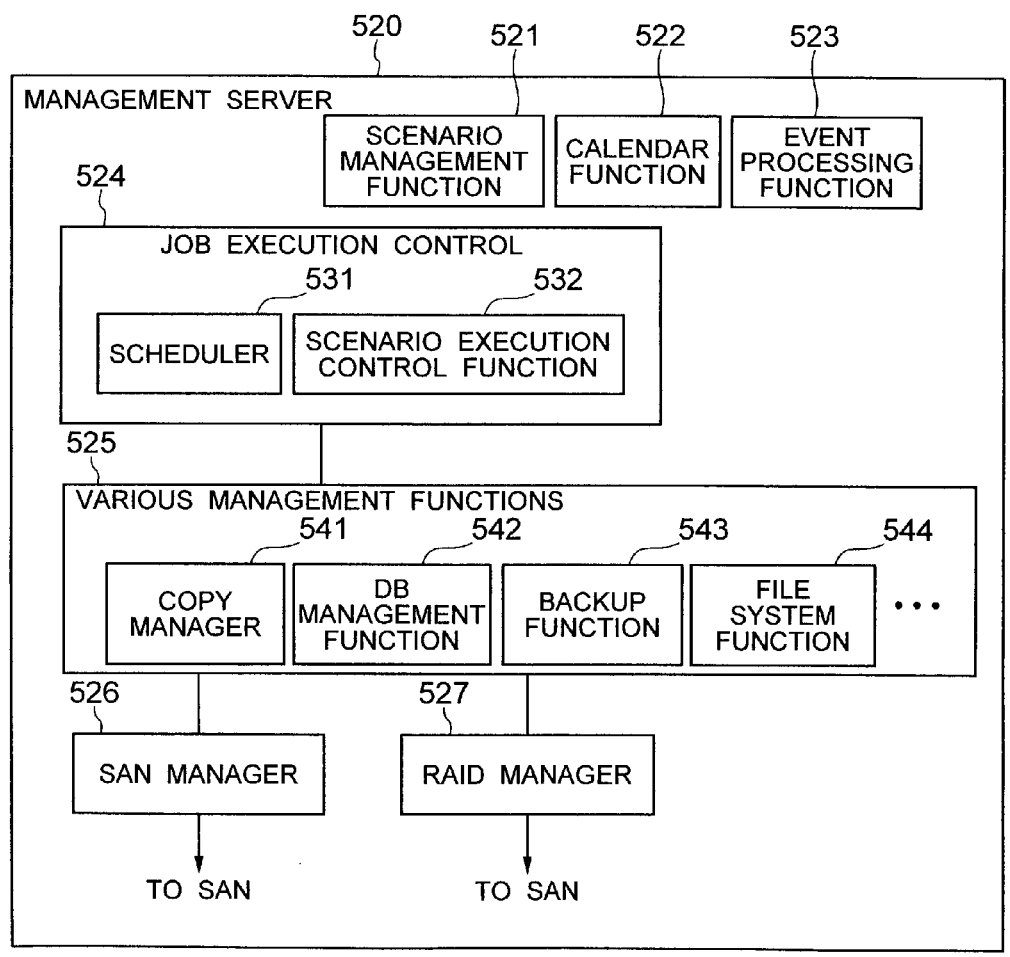

FIG. 5 shows a specific software configuration of the management client and management server explained in FIG. 2 and FIG. 3. The management client 510 is provided with a browser 511 to provide a user interface. The management server 520 is provided with a scenario management function 521, a calendar function 522, an event processing function 523, a job execution control 524, various management functions 525, a SAN manager 526 and a RAID manager (RAID apparatus control section) 527, etc. The job execution control 524 is provided with a scheduler 531 and scenario execution control function. The scheduler 531 performs control of starting the scenario according to schedule, etc. The scenario execution control function interprets a scenario and provides a function of executing each command. The various management functions 525 are sections to realize functions of the respective elements operating according to the scenario. The various management functions 525 include a data protection integrated control section (copy manager) 541, a DB management function 542, a backup function 543 and a file system function 544, etc. The SAN manager 526 manages the SAN. The RAID manager 527 controls the SAN's RAID.

FIG. 6A shows a repository configuration example. The repository is provided with configuration information 601 such as network configuration information 602 and storage configuration information 603, etc., scenario definition information (script) 604, schedule 605, policy definition information 606 and history information, etc. The network configuration information 602 is information indicating the network configuration with TCP/IP by which the devices in the system explained in FIG. 1 are connected and is, for example, an IP address of each device. The storage configuration information 603 is information indicating a configuration of storages connected via the fibre channels in the system explained in FIG. 1. The configuration information 601 is collected and stored by the application agent 413 in FIG. 4. The scenario definition information (script) 604, schedule 605 and policy definition information 606 are set by the user.

FIG. 6B shows an example of the storage configuration information 603. "Physical address and connection information" is connection information indicating physical addresses of disk apparatuses making up the SAN within the system and what disk apparatuses are connected to which fibre channel switches. "Information indicating DB location" indicates locations at which storages are installed (Tokyo, Osaka, etc.) and is referenced when backups are made to storages at a certain distance or farther according to the level of safety based on a policy. "Information indicating where backup of master DB is located" is referenced to perform restoration. "Information indicating earthquake resistance, 24-hour monitoring" is referenced when searching for a storage with high earthquake resistance and high level safety with 24-hour monitoring in the case where the policy specifies that a backup should be made safety first according to the purpose of use, etc. "Price per unit volume" is referenced when the policy specifies that a storage should be searched according to the price.

FIG. 6C indicates an example of policy definition information. "Purpose of use of master (backup or data warehouse)" is set when the policy specifies that a backup destination should be determined according to the purpose of use, etc. "Disk backup or tape backup" is set when the policy specifies that the backup destination should be determined according to the level of flexibility, etc. "Confidentiality level" is set when the policy specifies that the backup destination should be determined according to the level of confidentiality. "Past throughput, backup restoring time" is set when the policy specifies that the backup destination should be determined according to the level of performance, etc.

Figure 7:
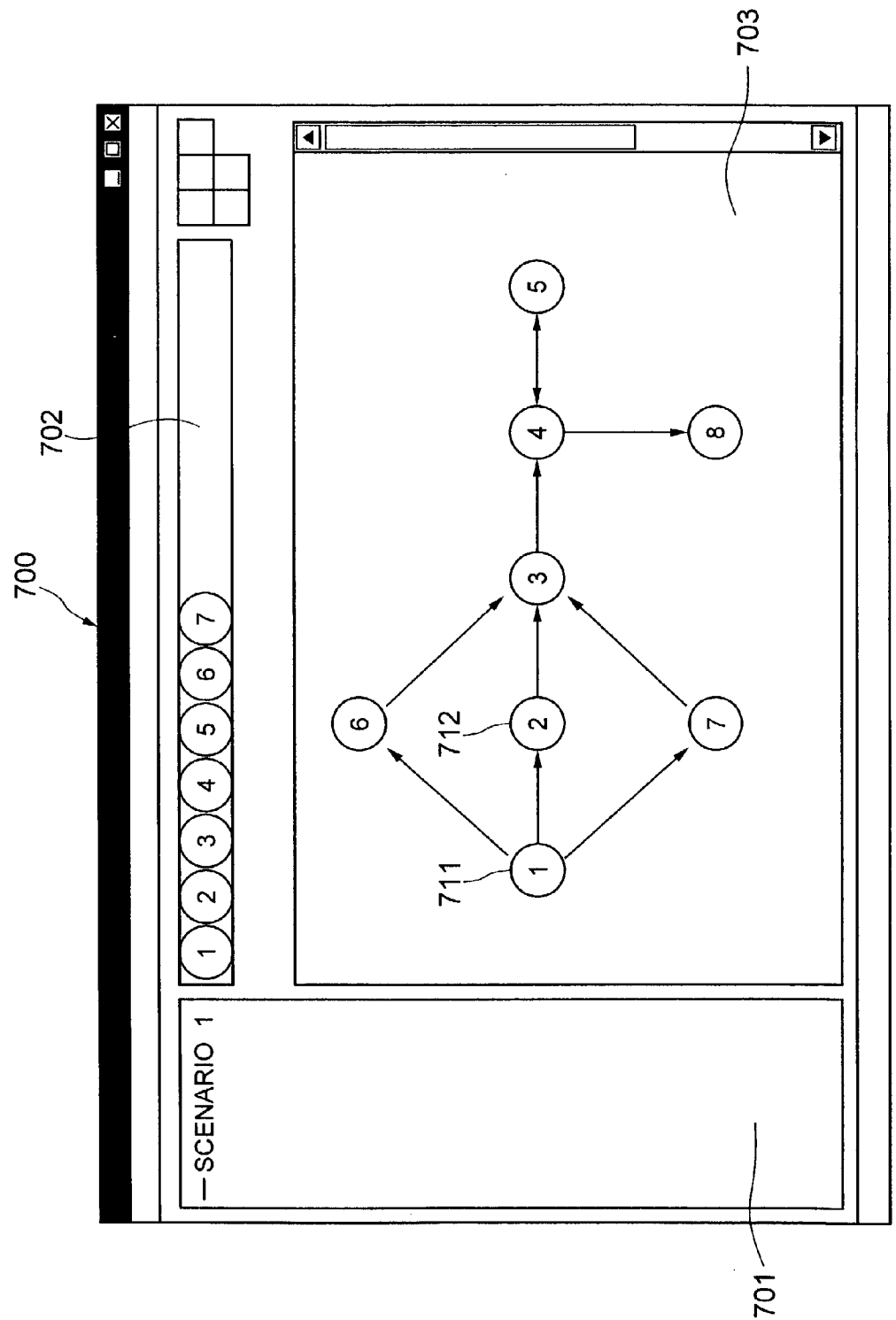
FIG. 7 illustrates an example of a scenario definition view.

FIG. 7 shows a view example which is part of a user interface. This view 700 on a screen shows a scenario definition view. Reference numeral 701 denotes names of scenarios to be defined. Numeral 702 denotes an icon group used for definition. Placing icons of the icon group 702 and specifying the processing procedure by arrows in a definition area 703 defines a scenario. Each icon indicates a command which is an element for making up a scenario. Especially, <6>, <2>and <7> indicate processes that can be executed simultaneously. <4> indicates that <5> is executed when a condition is satisfied.

Figure 8:
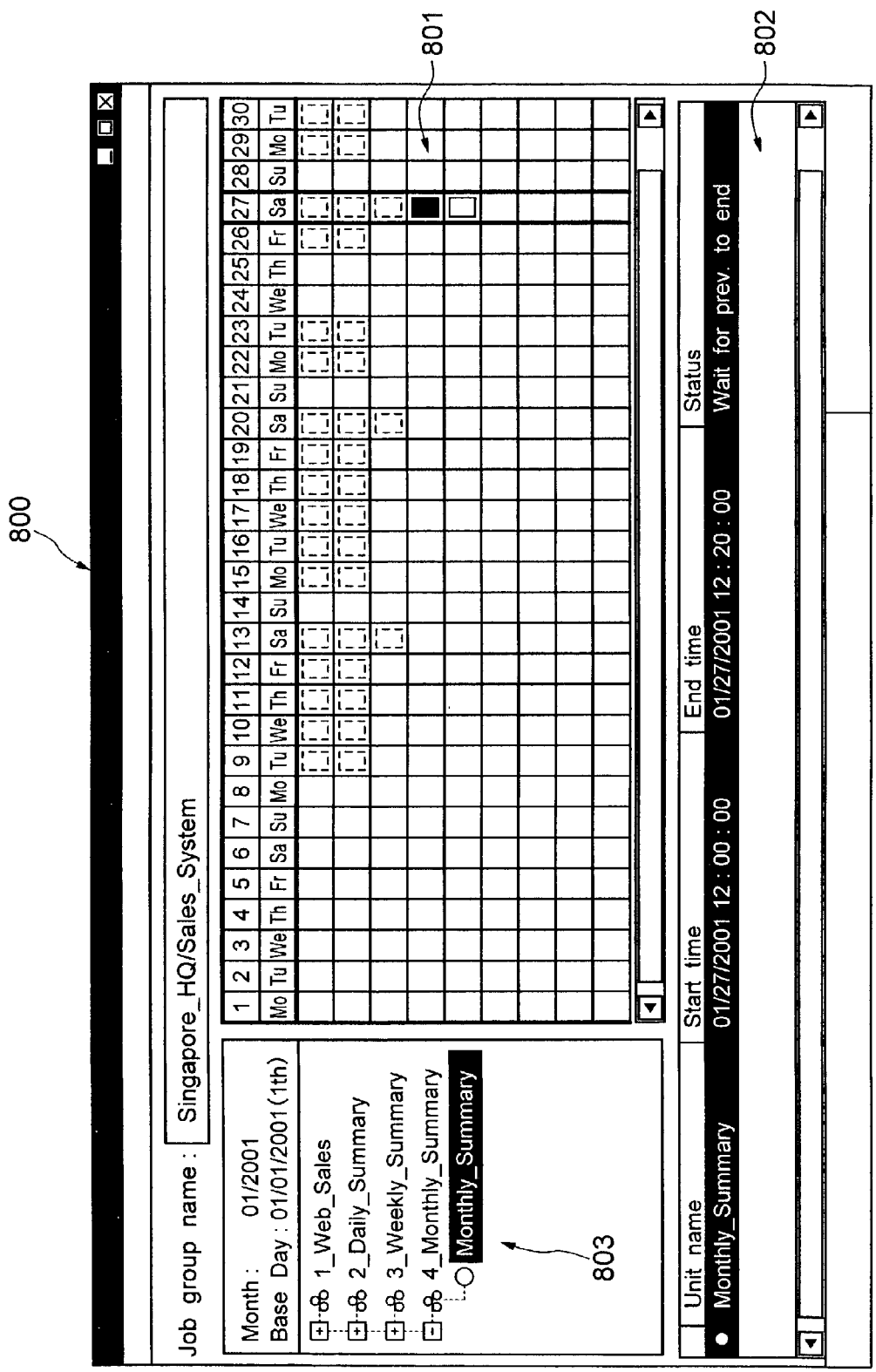
FIG. 8 illustrates an example of a schedule definition view.

FIG. 8 shows an example of a schedule definition view. The schedule definition view 800 on a screen is a view to define a schedule according to which a scenario is executed. Reference numeral 801 denotes an execution date/time specification area, 802 denotes an execution state display area and 803 denotes a schedule name display area. "1_Web_Sales" or "2_Daily_Summary", etc. displayed in a schedule name display area 803 indicates a schedule name. The date on which the schedule is to be executed is defined in the execution date/time specification area 801 to the right of each schedule name. A date whose execution date/time specification area 801 shows a rectangle indicates that the schedule is to be executed (or already executed) on that day. For each schedule, it is possible to define a scenario to be executed according to that schedule.

Next, a second embodiment of the present invention will be explained.

In the above-described first embodiment, any DB file can be backed up when the management client gives an instruction to the management server. Furthermore, using the functions of a scenario and a policy, backups can be executed by fewer operations.

However, a command which is input to give an instruction from the management client and a command which is an element of the processing of a scenario and a policy cannot be composed if details of the system are not known. For example, since the DB administrator manages the DB table, he/she can judge about the file of which table should be backed up, but does not know in which disk of which RAID the file to be backed up is, and therefore it is often unclear by which command the file should be backed up. There is actually a plurality of logical layers from the DB table to disk apparatus which actually stores the data of the table and each layer is managed by an independent tool, and therefore it is difficult to grasp the whole system.

In view of such a situation, the second embodiment maintains correspondences among elements in the respective layers of the system by management software and thereby makes it possible to transfer files such as backup files using simple commands without knowing the whole system.

Figure 10:
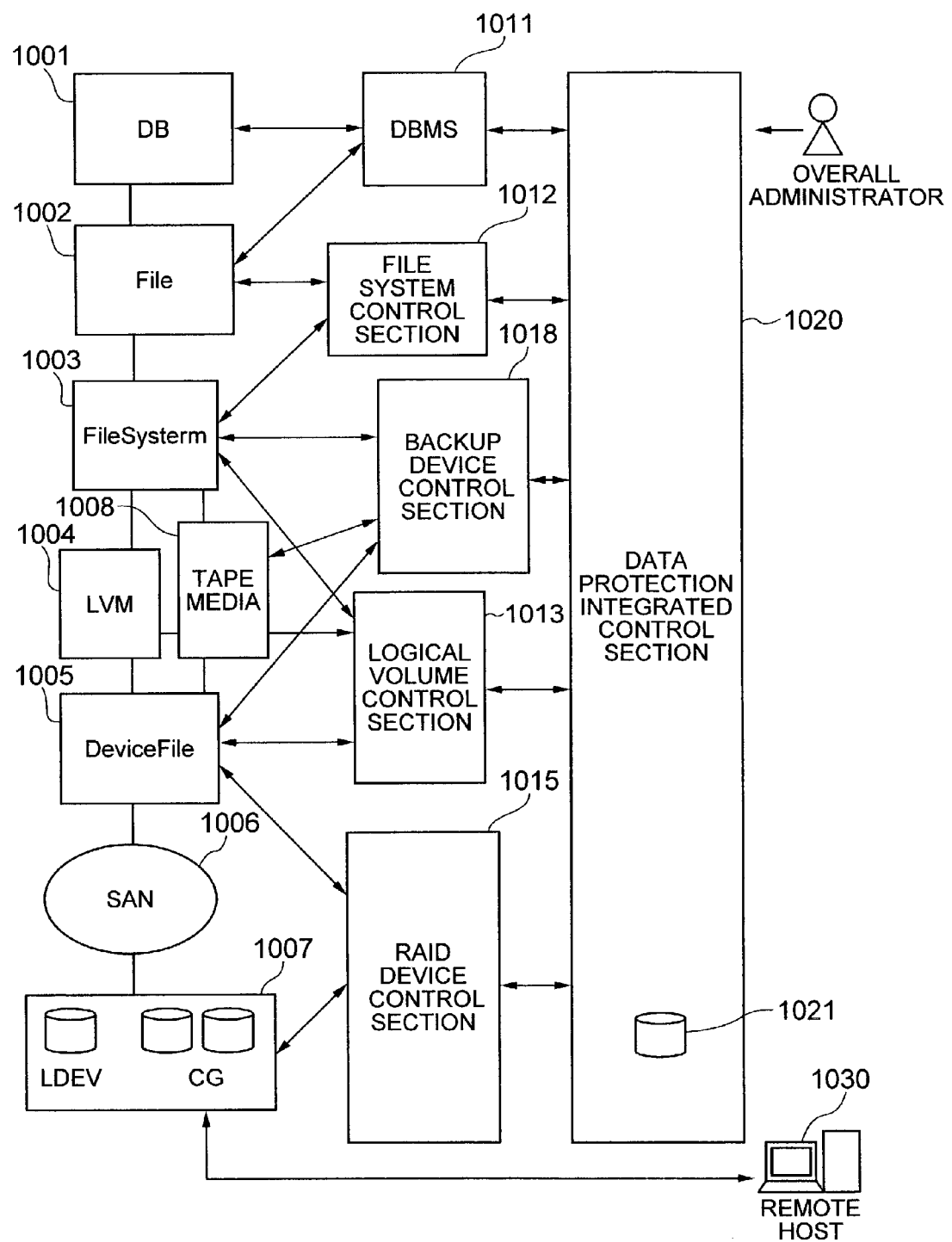
FIG. 10 is a block diagram showing logical layers and management tools in respective layers of a system according to a second embodiment.

FIG. 10 is a block diagram showing the logical layers and management tools in the respective layers of the system according to the second embodiment. By the way, since the second embodiment includes many parts common to those of the above-described first embodiment, parts different from those in the first embodiment in particular will be explained below.

In FIG. 10, reference numerals 1001 to 1007 on the left denote logical layers of the storage configuration of the system. DB 1001 shows a layer of a logical database. In this layer, the database is composed of several tables and each table is specified by a table name. File 1002 shows a layer of a logical file. In this layer, the table of the above database is composed of a logical file and each file is identified by a file name. FileSystem 1003 shows a layer of a logical file system. In this layer, a file system where logical files are stored is specified. LVM (logic volume) 1004 is a layer of a logical disk volume. In this layer, a logical volume is specified under a logical volume name. DeviceFile 1005 is a layer of a device file, which is an interface of each disk in the actual RAID making up a logical volume. In this layer, each disk making up a logical volume is specified by a logical device name. SAN 1006 is a layer of a storage area network made up of a RAID. LDEV 1007 is a layer of a physical disk. In this layer, the disk of the above-described logical device name is specified by a serial number which identifies the housing of the RAID and the device number which identifies each disk in the housing.

1011 to 1015 are provided as the management tools in the respective layers. DBMS (DB management system) 1011 is a tool which manages databases and files in the layer of the DB 1001 and File 1002. A file system control section 1012 is a tool for managing files and file systems in the layers of the File 1002 and FileSystem 1003. A logical volume control section 1013 is mainly a tool for managing logical volumes in the layer of the LVM 1004 and can further manage the layers of the FileSystem 1003 and DeviceFile 1005 in connection with logical volumes. A RAID device control section 1015 is a tool for managing RAIDs in the layers of the DeviceFile 1005 to LDEV 1007.

Because of the existence of the above-described layers, the only way to know, for example, in which disk a file of a table of a DB is stored is to enter a predetermined command using management tools of the respective layers and know their correspondences. Furthermore, it is often the case that while there is an administrator in each layer (e.g., DB administrator, file and file system administrator, backup administrator, logical volume control administrator, RAID administrator, etc.), an administrator of a certain layer does not know administrators of other layers.

This embodiment provides a data protection integrated control section 1020 that automatically collects information on correspondences between objects in the upper layer DB 1001 to the lower layer LDEV 1007. Furthermore, the data protection integrated control section 1020 provides a function capable of executing a backup or restoration by a single command based on the collected information. This allows an overall administrator needs only to give instructions to the data protection integrated control section 1020 using a simple command of "back up this DB table", for example, without having knowledge of all layers. This is because the data protection integrated control section 1020 searches for the table name tracking back from the upper to lower layers and easily identifies in which physical disk the table is stored and also because the group of the disks to be backed up is also predefined.

Reference numeral 1021 denotes a repository (management DB). The repository 1021 stores data similar to that of the repository in the above-described first embodiment, but the repository of this second embodiment includes link information indicating correspondences from the highest to lowest layers. Numeral 1030 denotes a remote host that shares the LDEV 1077. Numeral 1008 denotes the layer of a tape media used to make a backup to a tape apparatus. A backup apparatus control section 1018 is a management tool provided especially to simply carry out backup processing.

Figure 11:
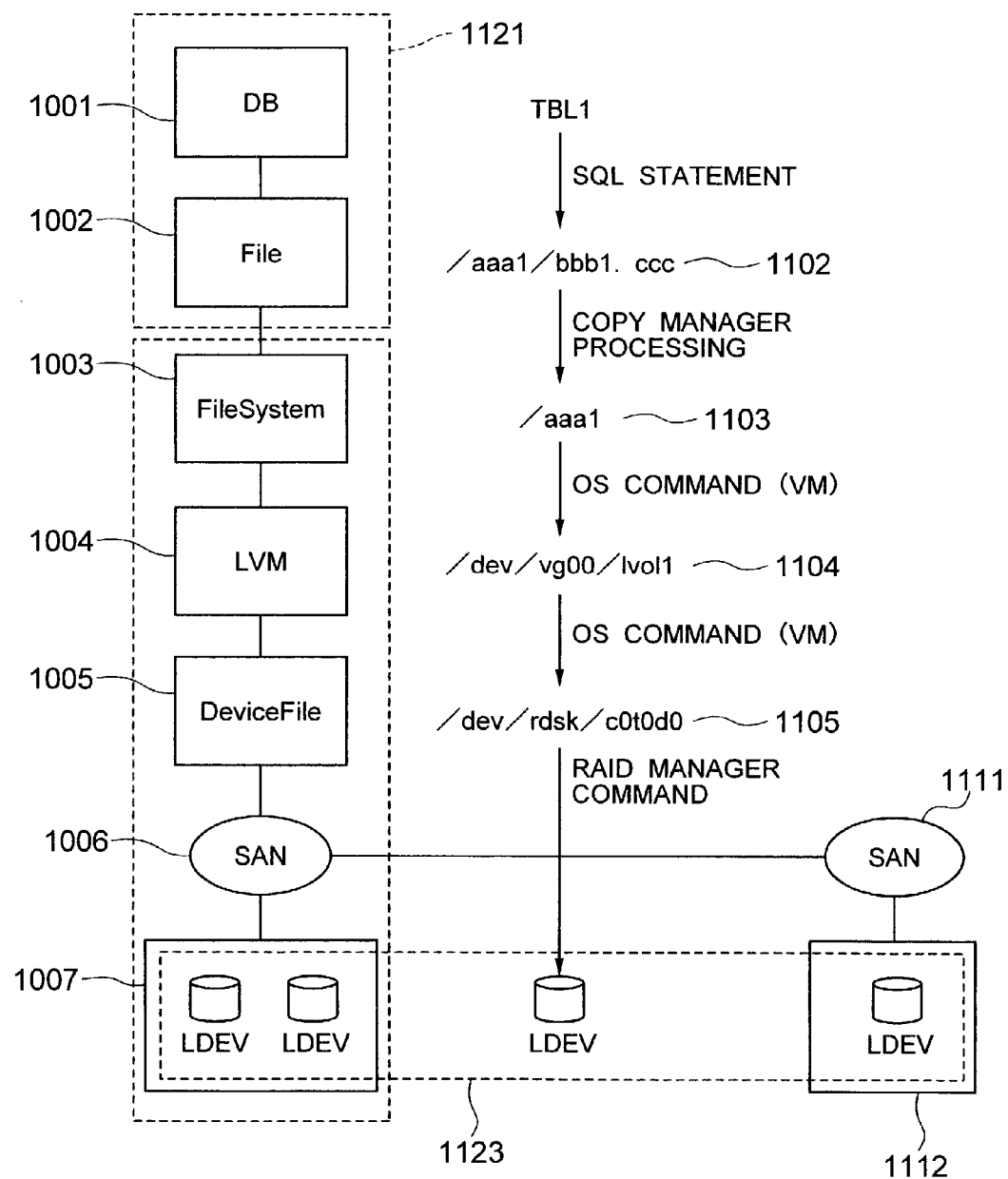
FIG. 11 illustrates an example of correspondences from DB table names to disks among various layers.

FIG. 11 shows an example of correspondences between various layers explained in FIG. 10 from DB table names down to disks. Reference numerals 1001 to 1007 denote the layers explained in FIG. 10. Numeral 1101 denotes a DB table name in the layer of DB 1001. It is possible to know using an SQL statement of the DBMS 1011 that the file constituting this table "TBL1" is "/aaa1/bbb1.ccc" 1102. From this file name, it is possible to know that the mount point is "aaa1" 1103 in the layer of the file system 1003. This is extracted by the data protection integrated control section 1020. Furthermore, using a command of the logical volume control section (VM) of the OS, it is possible to know that the logical volume that corresponds to this mount point is "/dev/vg00/lvol1" 1104. Here, /dev denotes a directory of a device file, vg00 denotes a volume group name identified by the logical volume control section. Using an OS command (logical volume control section), it is possible to know that the device name of the device corresponding to this logical volume is "/dev/rdsk/c0t0d0" 1105. Furthermore, using a command of the RAID apparatus control section, it is possible to know the information of the layer of the LDEV 1007 that corresponds to the device, that is, the serial number and device number of the disk that correspond to the device.

The data protection integrated control section 1020 collects the above-described correspondences using commands of the respective layers and stores the correspondences as link information in the repository 1021. More specifically, the link information is made up of an AP (application) map, CORE (core) map and CG (copy group) map. The AP map stores the correspondences in the range of a rectangle 1121 shown by dotted line. The CORE map stores the correspondences in the range of a rectangle 1122 shown by dotted line. The CG map is information that defines the LDEV group to which data is copied in the range of a rectangle 1123 shown by dotted line. While the AP map and CORE map describe the vertical correspondences of the figure, the CG map describes the horizontal correspondences of the LDEV. The CG (copy group) defined in the CG map can also include disks of other housings or remote disks. Reference numeral 1111 is a SAN, which is different from the SAN 1106. 1112 denotes the LDEV of the SAN 1106.

Figure 12:
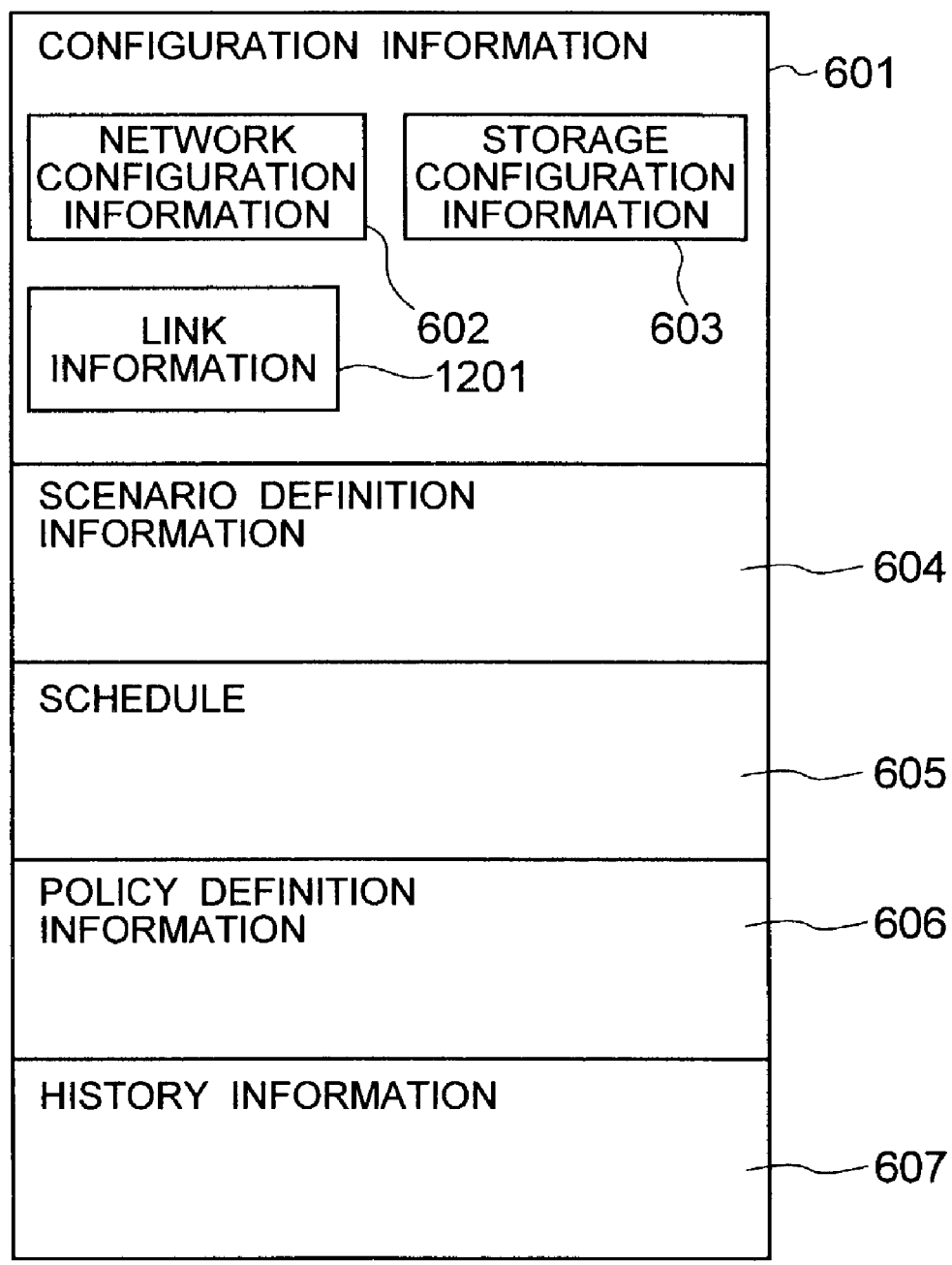
FIG. 12 illustrates a configuration example of a repository according to the second embodiment.

FIG. 12 shows a configuration example of the repository 1021 in FIG. 10. The same components as those in FIG. 6A are assigned the same reference numerals and explanations thereof will be omitted. In this embodiment, the link information 1201 is included in the configuration information 601. As described above, the link information 1201 consists of the AP map, CORE map and CG map.

FIGS. 13A–13C illustrate configurations of these map information pieces. FIG. 13A shows a configuration example of the AP map. The table name field shows the table name of the DB indicated in the layer of the DB 1001. The file name field is the file name of the layer of the file 1002 corresponding to the table name.

FIG. 13B shows a configuration example of the CORE map. The FS field shows the mount point indicated by the layer of the file system 1003. The LVM field shows a logical volume name of the layer of the LVM 1004 corresponding to the mount point. The Device field shows the device name of the layer of the device file 1005 corresponding to the logical volume. The RAID field shows the serial number and device number of the disk of the layer of the LDEV 1007 to which the device corresponds.

FIG. 13C shows a configuration example of the CG map. The name field shows the name given to a copy group (1-line record). The copy source field shows the serial number and device number of the disk to be the copy source of the data. The copy destination field shows the serial number and device number of the disk to which the data is to be copied. The TAPE field shows the media ID when the copy destination is a magnetic tape. The route information shows information of the route from the copy source to the copy destination.

The above-described map information is collected and stored when the data protection integrated control section 1020 issues management tool commands of the respective layers as described in FIG. 10 and FIG. 11. Basically, each map information piece is created when the data protection integrated control section 1020 is introduced initially. Furthermore, the map information can be refreshed when required at predetermined time intervals, etc. for each map to keep the information up to date. The CG (copy group) of the CG map can be named arbitrarily.

FIG. 14 shows a processing procedure when the administrator inputs a backup command from the data protection integrated control section 1020. The administrator basically only needs to input the name of a table to be backed up as a parameter and need not know in which disk the table is actually stored.

Initialization is performed in step 1401. This refers to processing such as a check of the parameter entered, setting of RAID environment variables, etc. In step 1402, resource information is acquired. This is the processing to create (refresh) each map information piece to obtain the latest map information.

Then, in step 1403, a backup file is registered. This refers to the processing of acquiring the names of files making up a table to be backed up which is specified by the administrator with reference to the above AP map and registering the file names as a backup target. Then, in step 1404, a copy group is selected. This is the processing of searching for copy groups whose file is a copy source based on the file name from the above-described CG map and allowing the administrator to select the copy group to be used for a backup this time from the copy groups found. Then, in step 1405, pair resynchronization processing is carried out. This is the processing of resynchronizing a pair of the copy source and copy destination of the selected copy group and instructing so that these disks have the same contents. The processing from steps 1403 to 1405 is repeated the number of times necessary for all tables to be backed up.

Then, in step 1406, the status of a copy group used for backups is confirmed. This is the processing of confirming the progress of pair resynchronization and confirming that the disks of each copy group have the same contents. Once this is confirmed, the DB in question is frozen in step 1407. This prohibits any change to the DB. Then, in step 1408, an instruction for pair splitting is sent to each copy group used for the backup. This is the processing of splitting the disk pair of the copy source and copy destination of the target copy group. In step 1409, it is confirmed that the pair has been split. In step 1410, the freezing of the DB in question is canceled. From then on, the copy source disk of the target copy group will accept changes. Since the copy destination disk of the target copy group keeps the content at the time of splitting, this becomes the backup. Finally, in step 1411, necessary information is registered in a backup catalog (file). This backup catalog also includes route information from the copy source to the copy destination. This information is used in the restoration processing if necessary.

Figure 15:
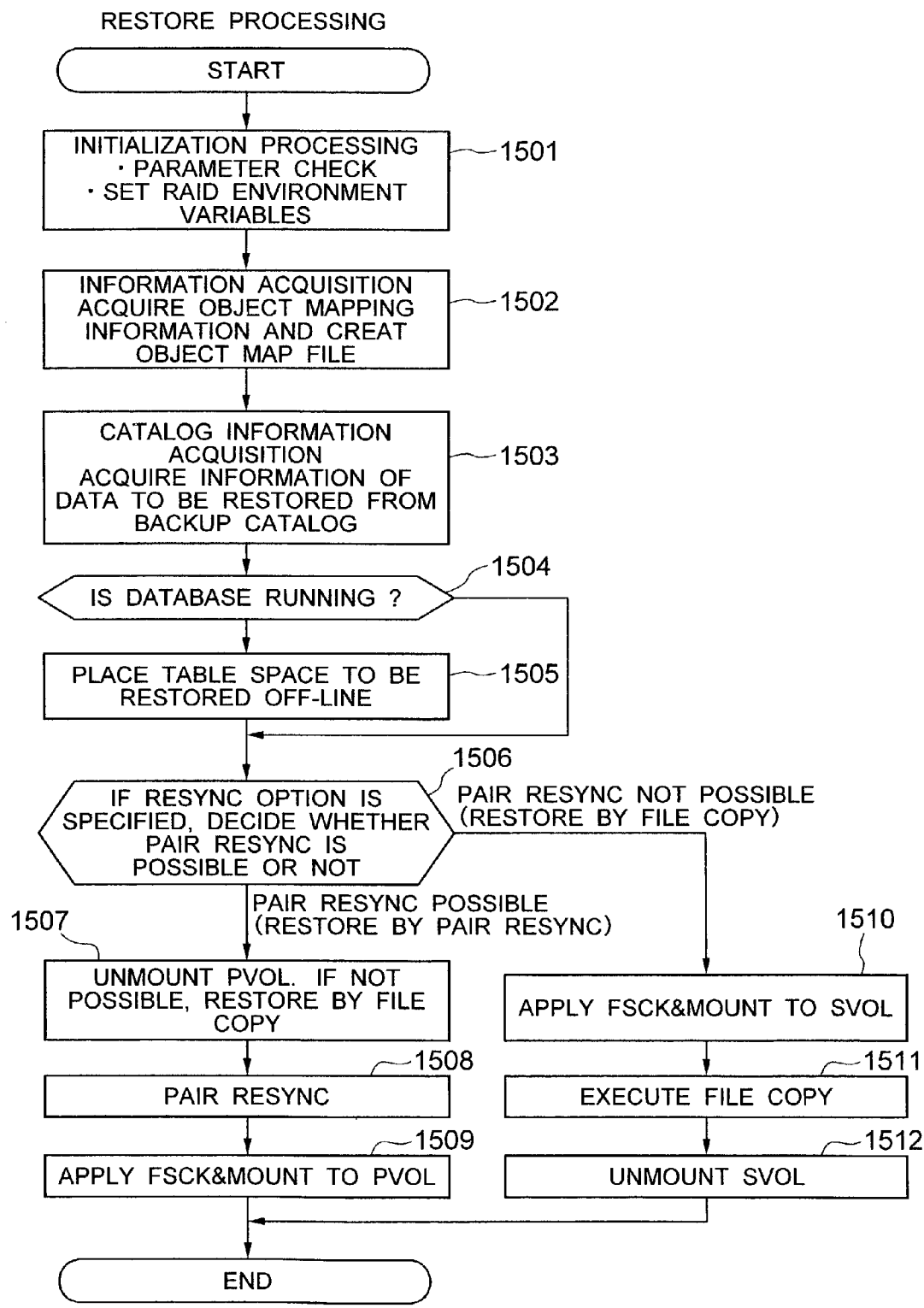
FIG. 15 is a flowchart showing a procedure for restoration processing.

FIG. 15 shows a procedure for processing when the administrator inputs a restore command from the data protection integrated control section 1020.

After the initialization processing is performed in step 1501, each map information piece is created in step 1502. Steps 1501 and 1502 are processes similar to steps 1401 and 1402. In step 1503, catalog information is acquired. This is the processing of acquiring information of data to be restored from the backup catalog created in step 1411. In step 1504, it is decided whether the DB is running or not and if it is running, the table space to be restored is placed off-line. If the DB is not running, the process directly moves on to step 1506.

In step 1506, if a RESYNC option is specified, it is decided whether pair resync is possible or not. If possible, the disk PVOL to which the backup data is to be restored is unmounted (separated from the file system) in step 1507. When unmounting is completed successfully, pair resync is performed in step 1508. This allows restoration to be performed from the disk SVOL in which the backup data exists to the disk PVOL to which the backup data is to be restored. Then, in step 1509, the PVOL is subjected to an FSCK & mount and the processing ends.

If pair resync is impossible in step 1506 and unmounting of the PVOL is impossible in step 1507, restoration is performed by a file copy. First, in step 1510, the SVOL is subjected to an FSCK & mount. Then, in step 1511, a file copy is made. This is the processing of making a copy from the disk SVOL in which the backup data exists to the disk PVOL to be restored. Then, the SVOL is unmounted and the processing ends.

By the way, the basic processing procedure is also the same when a backup is made to a magnetic tape. The magnetic tape apparatus only needs to be defined as the copy destination in the copy group. If the copy destination is a magnetic tape, the processing corresponding to the magnetic tape is performed. Furthermore, there can be any route between the copy destination and copy source. That route information is stored in the CG map, and therefore data can be transferred according to the route. If it is impossible to transfer data through that route, the data may also pass through another route. As a result, the route actually used for the data transfer is stored in the backup catalog and used for restoration.

According to the second embodiment above, since map information is utilized the administrator can instruct file transfer such as a backup by simple operations without grasping the entire system. By defining the copy group, it is possible to simply perform file transfer between arbitrary disks. For example, when backups for several generations need to be made using a disk A as a master, a first copy group between the disk A and disk B1, second copy group between the disk A and disk B2 and third copy group between the disk A and disk B3, . . . , etc. are defined. It is possible to make a first-generation backup to the disk B1 using the first copy group, a second-generation backup to the disk B2 using the second copy group and a third-generation backup to the disk B3 using the third copy group, and so on.

It is further possible to combine the functions of the scenario, policy and schedule explained in the above-described first embodiment and the second embodiment. In this case, a backup and restoration using map information can be used as one of processing elements (commands) to be executed according to a scenario or policy.

Commands for using map information include verify, map information display, copy group lock/unlock, etc. in addition to the above-described backup and restore.

As described above, when the target data is transferred between the SAN storing means for backing up data stored in the SAN (Storage Area Network), since the present invention instructs a data transfer to the transfer source and transfer destination via a network which is different from the above-described SAN, it is easy to specify backups to remote places, which allows for diversification of risk. Therefore, it is possible to make backups in a unified manner at backup sites and MSP (Management Service Provider) that operate under an around-the-clock system with high reliability equipment. Furthermore, since it is possible to easily replicate data, the present invention can easily create replication database to be used for data warehouse, mining and decision-making support system, etc. Use of link information such as an AP map, CORE map and CG map, etc. makes it possible to perform file transfers with simple commands without the user's grasping the entire system.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A file transfer method of transferring data stored in a Storage Area Network (SAN), comprising the steps of:
    instructing execution of a scenario describing a series of steps for carrying out a file transfer;
    executing transfer processing according to said instructed scenario and sending a data transfer instruction, when data to be transferred is transferred between SAN storing means, to a transfer source and a transfer destination of said file transfer via a network which is different from said SAN; and
    receiving the data transfer instruction via said network and transferring the data to be transferred between said SAN storing means using a function of the SAN,
    wherein a plurality of transfer locations are selected according to a past history using a procedure of said scenario.

2. A file transfer method of transferring data stored in a Storage Area Network (SAN), comprising the steps of:
    sending a data transfer instruction, when data to be transferred is transferred between SAN storing means, to a transfer source and a transfer destination of said file transfer via a network which is different from said SAN; and
    receiving the data transfer instruction via said network and transferring the data to be transferred between said SAN storing means using a function of the SAN,
    wherein when a disk to which data is transferred lacks free space, the data is automatically transferred to other transfer destinations.

3. A file transfer method of transferring data stored in a Storage Area Network (SAN), comprising the steps of:
    storing, when there are logical layers of data in a system that uses SAN storing means, map information that stores correspondences of identifiers for identifying data among said logical layers;
    storing copy group map information for defining a group of disks of a copy source and a copy destination when data is copied;
    instructing data transfers by specifying data using identifiers in arbitrary layers;
    acquiring identifiers in said layers of data instructed to be transferred using said map information;
    acquiring a copy group storing said data instructed to be transferred in the copy source using said copy group map information; and
    matching content of the copy source with content of the copy destination for the acquired copy group, splitting those disks and acquiring data of the same content as that of the copy source disk in the copy destination disk.

4. A file transfer method of transferring data stored in a storage apparatus, comprising the steps of:
    accepting a data transfer instruction by specifying data using an identifier in an arbitrary layer;
    using map information which stores correspondences of identifiers for identifying data based on logical structures of the data among said logical structures and acquiring the identifiers of respective logical structures about the data instructed to be transferred;
    acquiring a copy group storing said data instructed to be transferred in a copy source using copy group map information in which groups of disks to which data is copied of copy sources and copy destinations are defined; and
    instructing software of the respective logical structures based on the acquired identifiers and copy groups to transfer data.

5. A file transfer program for transferring data stored in a storage apparatus, comprising the steps of:
    accepting a data transfer instruction by specifying data using an identifier in an arbitrary layer;
    using map information which stores correspondences of identifiers for identifying data based on logical structures of the data among said logical structures and acquiring the identifiers of respective logical structures about data instructed to be transferred;
    acquiring a copy group storing said data instructed to be transferred in a copy source using copy group map information in which groups of disks to which data is copied of copy sources and copy destinations are defined; and
    instructing software of the respective structures based on the acquired identifiers and copy groups to transfer data.

* * * * *